United States Patent [19]

Takahashi

[11] Patent Number: 5,026,797

[45] Date of Patent: Jun. 25, 1991

[54] PROCESS FOR PRODUCING ETHYLENE COPOLYMERS

[75] Inventor: Tadashi Takahashi, Yokkaichi, Japan

[73] Assignee: Mitsubishi Petrochemical Co., Ltd., Tokyo, Japan

[21] Appl. No.: 260,599

[22] Filed: Oct. 20, 1988

[30] Foreign Application Priority Data

Oct. 22, 1987 [JP] Japan ............................ 62-267500

[51] Int. Cl.[5] ...................... C08F 4/648; C08F 210/02
[52] U.S. Cl. .................................... 526/124; 502/117; 526/129; 526/156; 526/160; 526/348.6; 526/901
[58] Field of Search ............... 526/124, 129, 160, 165, 526/156

[56] References Cited

U.S. PATENT DOCUMENTS

| | | | |
|---|---|---|---|
| 4,794,096 | 12/1988 | Ewen | 526/160 |
| 4,808,561 | 2/1989 | Welborn | 526/129 |
| 4,874,734 | 10/1989 | Kioka et al. | 502/103 |

FOREIGN PATENT DOCUMENTS 63-66206 3/1988 Japan ................................ 526/160

*Primary Examiner*—Edward J. Smith
*Attorney, Agent, or Firm*—Koda & Androlia

[57] ABSTRACT

A process for producing ethylene copolymers by copolymerizing ethylene with an α-olefin having 3 to 10 carbon atoms in the gas phase polymerization method in the presence of a catalyst comprising such a solid component, component (A), that a zirconium compound having formed a II-bonding with a conjugated five-membered ring such as bis(cyclopentadienyl)zirconium dichloride is carried on a support of porous particles of a water-insoluble inorganic oxide such as silica which have been preliminarily treated with an alumoxane, and an alumoxane, component (B), characterized in that the alumoxane as the component (B) is in the form of a solution in an aromatic hydrocarbon in a concentration of at least 5% (w/v) and the component (A) and the component (B) are introduced into a polymerization vessel after they have been contacted with each other.

20 Claims, No Drawings

5,026,797

PROCESS FOR PRODUCING ETHYLENE COPOLYMERS

BACKGROUND OF THE INVENTION

1. Field of the Art

The present invention relates to a process for producing ethylene copolymers. More particularly, it relates to a process for producing ethylene copolymers by copolymerizing ethylene with an α-olefin having 3 to 10 carbon atoms characterized in that a polymerization catalyst having been prepared under a specific condition is used.

2. Prior Art

Recently, a catalyst consisting essentially of bis(cyclopentadienyl)zirconium chloride and methylalumoxane has been found to have excellent properties that it affords an extremely high polymerization activity in the copolymerization of ethylene with hexene and has a high sensitivity to hydrogen or comonomers to give a copolymer which has a Q value which is a ratio of $M_w/M_n$ of 3 or less and thus has an excellent randomness, and the spotlight of attention has been focused upon it [Studies in Surface Science & Catalysis, "Catalytic Polymerization of Olefins" pp. 293–304, Kodansha/Elsevier (1986), W. Kaminsky: Preparation of Special Polyolefins from Soluble Zirconium Compounds with Aluminoxane as Cocatalyst].

This catalyst system is a homogeneous catalyst which is soluble in a solvent for polymerization and has no catalyst particles which are to serve as "cores" of polymer particles. Thus, when it is used for gas phase polymerization which is substantially performed under the formation of polymer particles, particle-forming reaction does not proceed uniformly and it may be impossible to operate the reaction system for a long period because of the troubles such as the generation of blocks of polymer due to the aggregation of the polymer particles or adhesion of the polymer to the wall of a reaction vessel or reactor.

For the purpose of solving the problem, there has been proposed a process in which the catalyst components are carried on a support of an inorganic oxide such as $SiO_2$ or the like (Unexamined Published Japanese Patent Application Nos. 108610/1986 and 296008/1986).

However, in this process a catalyst which carries both the zirconium compound and the alumoxane is used and no further addition is made of an alumoxane which enhances the zirconium compound, and accordingly the catalyst activity per support remains at low levels. According to our knowledge, the method could also have a problem in view of its application for the gas phase polymerization method that there is an induction period before the generation of the activity and may thus want further improvement. In a gas phase polymerization method wherein polymer particles are maintained in a fluidized bed housed in a reaction vessel by a reaction gas flowing upwardly, the reaction vessel is ordinarily provided with a circulating system through which a gas phase in the reaction vessel is taken out from the reaction vessel and returned to the reaction vessel after it has undergone the temperature control. However, when a solid catalyst component introduced into the reaction vessel has a long induction period until the initiation of polymerization and thus will not rapidly develop its activity, the catalyst component will be carried away by the gas into the circulating system and polymerization proceeds in the circulating system and blocks it, so that it would be quite impossible to continue stable operation for a long period. Thus, the presence of the induction period in the gas phase polymerization is a fatal defect for its industrial application.

A method that an alumoxane is separately added to a solid catalyst component in which both a zirconium compound and an alumoxane are carried on the support to conduct polymerization is disclosed in Unexamined Published Japanese Patent Application No. 51407/1988. Methods that an alumoxane is separately added to a variety of solid catalyst components carrying a zirconium compound are disclosed in Unexamined Published Japanese Patent Application Nos. 22804/1988, 51405/1988, 54403/1988, 51489/1988, 61010/1988, 66206/1988 and 89505/1988 and the International Publication of WO 88/01626.

However, in such specifications, nothing may be described about the contact of the solid catalyst component and the alumoxane in a solution state just before they are fed into the reactor nor the concentration of the alumoxane on the contact of them. In Example 24 of the International Publication, particulate NaCl is used as a dispersant for gas phase polymerization.

SUMMARY OF THE INVENTION

The present invention has been done as a result of researches for the purpose of eliminating the aforementioned problems.

In other words, the present invention provides a process for producing ethylene copolymers by copolymerizing ethylene with an α-olefin having 3 to 10 carbon atoms in the presence of a catalyst comprising a solid component [component (A)] such that a zirconium compound having formed a n-bonding with a conjugated five-membered ring is carried on a support of a water-insoluble porous inorganic oxide which has been preliminarily treated with an alumoxane and an alumoxane [component (B)] in the gas phase process, characterized in that said alumoxane as the component (B) is in the form of a solution in an aromatic hydrocarbon in a concentration of at least 5% (w/v) and the component (A) and the component (B) are introduced into a polymerization vessel after they have been contacted with each other.

According to the process of the present invention, there is no induction period at the initiation of polymerization which should be avoided as far as possible in gas phase polymerization, and the catalyst activity per support or per solid catalyst is high. Additionally, the solid catalyst component (A) used in the process of the present invention comprises a zirconium compound having formed a π-bonding with a conjugated five-membered ring being carried on a support of a porous inorganic oxide which has been preliminarily treated with an alumoxane and the zirconium compound will not elute during polymerization, so that the formation of particles proceeds stably without the formation of a block of polymers due to the agglomeration of the polymer.

DETAILED DESCRIPTION OF THE INVENTION

The catalyst used for the process of the present invention is a catalyst comprising a solid component [component (A)] such that a zirconium compound having formed a n-bonding with a conjugated five-membered ring is carried on a support of a porous water-insoluble inorganic oxide which has been preliminarily treated with an alumoxane and an alumoxane [component (B)].

Component (A):

As the porous water-insoluble inorganic oxide particle support used for the component (A), there can be mentioned silica, alumina, magnesia, titania, zirconia or the like, preferably silica, alumina and zirconia, for which particles having a surface area from 20 to 500 m$^2$/g (BET method), a pore volume from 0.2 to 2.5 cc/g and a mean particle diameter from 10 to 80 μm are preferably used. They are used desirably after dehydration, i.e. drying at 150° to 900° C. under the atmosphere of nitrogen or air to remove surface water.

The alumoxane used for the treatment of these porous oxide support particles, which is also called as an aluminoxane, is obtained by the reaction of a trialkylaluminium and water and can be prepared under a variety of conditions well known in the art. For instance, an alumoxane is obtained by adding a trialkylaluminium to an aromatic hydrocarbon such as benzene, toluene or the like, then adding a salt having water of crystallization such as copper sulfate pentahydrate to the mixture and conducting reaction under the temperature condition from −40° to +60° C. The amount of water usually used in the reaction is from 0.5 to 1.5 moles in proportion to 1 mole of the trialkylaluminium. The alumoxane obtained is a linear or cyclic polymerized aluminium compound and has 4 to 50 alkyl groups inherent in the trialkylaluminium used. The alumoxane preferably used in the present invention is the one having 6 to 30 $C_1$-$C_4$ lower alkyl groups.

As the trialkylaluminium used for the preparation of the alumoxane, there can be mentioned a trialkylaluminium having 1 to 8, preferably 1 to 6, carbon atoms, preferably tri(lower alkyl)aluminiums such as trimethylaluminium, triethylaluminium, trihexylaluminium or the like, more preferably trimethylaluminium.

The contact treatment of the above-described oxide support with the alumoxane in the preparation of the component (A) is usually conducted by adding sequentially or simultaneously the oxide support and the alumoxane to a solvent for the almoxane such as an aromatic hydrocarbon solvent such as benzene, toluene or the like. The treatment temperature is 20° to 100° C., preferably 40° to 100° C., and the treatment time is 30 minutes to 20 hours, preferably 1 to 8 hours.

The concentration of the alumoxane used in the treatment being not critical, the contact is preferably performed at a weight ratio of the alumoxane/oxide support from 0.07 to 1.2. After the contact treatment, the treated support is rinsed with an aromatic hydrocarbon solvent until no alumoxane is detected in the supernatant. Thus, it is possible to adjust the amount of the aluminium atom of the alumoxane bonded onto the treated oxide support in the range of 2 to 10% by weight, and it is preferred to use the treated support in this range.

As described above, the zirconium compound having been n-bonded with a conjugated five-membered ring is carried on the oxide support having been treated with the alumoxane by adding the support and the zirconium compound sequentially or simultaneously to an aromatic hydrocarbon solvent such as benzene, toluene or the like and contacting them at a temperature of 20° to 100° C., preferably 40° to 100° C. and for 30 minutes to 20 hours, preferably 1 to 8 hours. The zirconium compound is relatively sparingly soluble in solvent, and thus it is better to dissolve preliminarily the compound and then to react with the oxide support. The concentration of the zirconium compound being not critical, contact is preferably conducted at a weight ratio of the zirconium compound/oxide support in the range from 0.002 to 0.04. After contact, the resulting support carrying the resulting zirconium compound can be sufficiently rinsed with the solvent to adjust the amount of the transition metal (Zr) in the oxide support in the range of 0.01 to 2% by weight, preferably 0.05 to 1.2% by weight. The catalyst component carried on the support thus obtained is usually dried and stored under nitrogen.

As the zirconium compound which has been n-bonded to a conjugated five-membered ring as an active component of the component (A) of the catalyst used in the process of the present invention, there are used well known compounds such as disclosed in Unexamined Published Japanese Patent Application Nos. 19309/1983, 35007/1985, 130314/1986, 296008/1986, 119212/1987, 121710/1987, etc.

As the specific examples of the component (A), there can be mentioned zirconocene compounds, such as, for example, bis(cyclopentadienyl)zirconium dichloride, bis(cyclopentadienyl)zirconium chloride hydride, bis(cyclopentadienyl)zirconium dimethyl, bis(methylcyclopentadienyl)zirconium dichloride, bis(dimethylcyclopentadienyl)zirconium dichloride, bis(pentamethylcyclopentadienyl)zirconium dichloride, bis(ethylcyclopentadienyl)zirconium dichloride, bis(n-butylcyclopentadienyl)zirconium dichloride, bisindenylzirconium dichloride, ethylene bisindenylzirconium dichloride, ethylenebis(4,5,6,7-tetrahydro-1-indenyl)zirconium dichloride, or the like. One of the specific examples of the "conjugated five-membered ring" is a cyclopentadienyl ring having 0 to 5 lower alkyl, e.g., $C_1$-$C_4$, substituent(s). If plurality of, particularly two of, the lower alkyl substituents are present, these substituents can be bonded to each other to form a ring. An example of such a substituted cyclopentadienyl ring is 4,5,6,7-tetrahydroindenyl group.

Another example of the "conjugated five-membered ring" is one which can be considered to be a specific example of the above-described substituted cyclopentadienyl group, and has the substituent itself in the relationship of conjugation with the conjugated five-membered ring, namely an indenyl group, for example.

Amongst those described above, more preferable are: bis(cyclopentadienyl) dichlorides where the cyclopentadienyl group may have no substituent or may have 1 to 5 lower alkyl substituent(s), such as bis(cyclopentadienyl)zirconium dichloride, bis(methylcyclopentadienyl)zirconium dichloride, bis(pentamethylcyclopentadienyl)zirconium dichloride, bis(n-butylcyclopentadienyl)zirconium dichloride, etc. Component (B):

The alumoxane used as the component (B) is selected from those which can be used for the preparation of the component (A). The alumoxanes for the component (A) and the component (B) may be the same or different. The alumoxane as the component (B) is used as its solution in an aromatic hydrocarbon such as benzene, a lower alkyl substituted benzene, e.g. toluene, xylene, ethylbenzene or the like in the concentration of 5% to 50% (w/v), preferably from 5 to 30% (w/v). The aromatic hydrocarbon solution can include other hydrocarbons such as isopentane, hexane, heptane or the like in an amount of up to 50% by volume as far as the alumoxane does not precipitate from the solvent mixture. The alumoxane of the component (B) may be prepared so that the concentration will be 5% (w/v) or more in the step of the aforementioned alumoxane synthesis, or it may be prepared as a solution in a lower concentration which will then be concentrated by an operation such as distillation.

In the case of the production of an ethylene copolymer by copolymerizing ethylene with an α-olefin having 3 to 10 carbon atoms in the gas phase polymerization method so that the density is in the range of 0.93 g/cm$^3$ or less, preferably from 0.86 to 0.93 g/cm$^3$ as in the process of the present invention, if a large amount of the solvent for the alumoxane such as benzene, toluene or the like is introduced in the polymerization vessel, problems such as lowering the melting point of the polymer particles, increasing the fusing ability or making hard the removal of the solvent from the polymer particles because of the high solubility of the solvent to polymer will be caused, and thus the amount of the solvent should be reduced as low as possible.

The contact of the component (A) and the component (B) prior to the polymerization reaction is conducted just before the introduction of these components into the polymerization vessel with a contact time for 0.5 second or more to 1 hour, preferably 1 second to 30 minutes. The component (A) is activated very rapidly by the contact with the component (B) in a slurry state, and thus a short time of the contact is sufficient enough for its activation. If the components are contacted for too long a time, the zirconium compound will be unfavorably deactivated by the component (B). If the component (A) and the component (B) are separately supplied to the gas phase polymerization vessel, it is presumed that these components are not activated quickly as the contact activation of these components will not proceed effectively in the gas phase. The contact of the components (A) and (B) in a slurry state described above is important for the effective activation of them.

If the concentration of the component (B) is decreased below the range used in the process of the present invention, the activation will likely proceed relatively easily and the prior contact of the components (A) and (B) may sometimes be unnecessary. However, in this case, the amount of the solvent supplied to the polymerization increases, and such a process is not preferred because the necessity of removing the solvent from the resulting polymer is also enhanced or the resulting polymer absorbs the solvent to increase adhesion and thus the polymerization system becomes less stable.

Although it is preferable that the total amount of the component (B) required be used in this contact, the component can be used in portions with a balance to be supplied separately.

The ratio of the component (B) and the component (A) to be used is such that the Al/Zr atomic ratio is in the range of 150 to 10,000, preferably 450 to 5,000.

The polymerization of ethylene with an α-olefin having 3 to 10 carbon atoms is conducted in the gas phase method where substantially no solvent nor dispersant for polymerization is used, and can be conducted in either the fluidized bed gas phase method where polymerization proceeds with the fluid state of the resulting copolymer maintained by the circulating gas in the reaction system or the agitation gas phase method where polymerization proceeds with the fluidity of the resulting copolymer maintained by the agitation blade. It is also possible to conduct polymerization by either method of continuous polymerization or batch-wise polymerization. The polymerization pressure and the ethylene partial pressure are in the range of atmospheric pressure to 50 kg/cm$^2$, and the polymerization temperature is in the range of 20 to 95° C., preferably 50° to 85° C. The polymerization temperature is changed depending on the density and molecular weight of the resulting ethylene copolymer. The lower the density, the lower temperature is employed in order to prevent the fusing of the polymer. The higher the molecular weight, the lower polymerization temperature is employed in order to reduce the chain transfer.

In the process of the present invention, the molecular weight and density of the ethylene copolymer obtained can be varied by changing the hydrocarbon moiety bonded to the conjugated five-membered ring.

In the process of the present invention, the duration of polymerization is in the range of 30 minutes to 10 hours, preferably 2 to 5 hours.

The α-olefin having 3 to 10 carbon atoms used in the present invention is propylene, butene, hexene, 4-methylpent-1-ene, octene, decene and mixtures thereof. As the ethylene copolymer having a density of 0.86 to 0.93 g/cm$^3$ is produced, the α-olefin is generally comprised in a proportion of about 1 to 25 mole%. The density of copolymers can be controlled by such a conventional method that the ratio of the comonomer to ethylene in the gas phase is varied.

The molecular weight of the ethylene copolymer on polymerization can be controlled by well-known means such as hydrogen, polymerization temperature or the like, and it can be lowered easily by increasing hydrogen or raising polymerization temperature.

Following are examples not for limiting but for describing in more detail the present invention.

EXAMPLE 1

Preparation of an alumoxane:

To 565 ml of a toluene solution containing 48.2 g of trimethylaluminium was added under agitation 50 g of a copper sulfate pentahydrate in 5 g portions with an interval of 5 minutes at a temperature of 0° C. After completion of addition, the temperature of the mixture was raised slowly up to 25° C., and the reaction was conducted for 2 hours at 25° C. and additionally 2 days after the temperature was raised up to 35° C. The residual solid of the copper sulfate was filtered off to obtain an alumoxane solution in toluene. The concentration of methylalumoxane poroduced was 27.3 mg/ml (2.7% (w/v)). The solution was designated as Liquid I.

The toluene was removed under reduced pressure to obtain the following alumoxane solutions having a variety of concentrations:
Liquid II: 7.4% (w/v),
Liquid III: 11% (w/v),
Liquid IV: 26% (w/v).

Reaction of silica and methylalumoxane:

In the nitrogen stream, 10 g of silica "952", manufactured by Davison Co., which had been dried at 600° C. for 4 hours was added to 120 ml of the above-described alumoxane Liquid I (alumoxane, 3.3 g), and the mixture was caused to react at 60° C. for 1 hour and rinsed sufficiently with toluene to remove the unreacted alumoxane.

Reaction of the above-described methylalumoxane-treated silica and bis(cyclopentadienyl)zirconium dichloride. To a slurry of the above-described methylalumoxane-treated silica was added 0.25 g of bis(cyclopentadienyl)zirconium dichloride, and the mixture was kept at 25° C. for 2 hours, rinsed with toluene and dried under reduced pressure at 40° C. for 1 hour and additionally at 85° C. for 1 hour. One gram of the solid contained 57 mg of Al and 2.4 mg of Zr, which was used as solid catalyst (I).

Quantitative analysis of the Al was conducted by extraction with a 5% by volume concentration of an aqueous sulfuric acid solution and subsequent EDTA (ethylenediaminetetraacetic acid) back titration method using $ZnSO_4$, and the quantitative analysis of the Zr by extraction with a 0.5N aqueous nitric acid solution and subsequent EDTA back titration method using Bi(-NO$_3$)$_3$.

Copolymerization of ethylene and butene:

In a 1.5 liter internal volume autoclave in which 38 g of granules of a linear low density polyethylene having a melt index of 1.2, a butene content of 4.2 mole%, a density of 0.920 g/cm$^3$ and a bulk specific gravity of 0.40 had been charged as a seed polymer was introduced, at a temperature of 60° C., 1.7 ml of the above-described alumoxane, Liquid III (corresponding to 190 mg of the alumoxane), and 0.12 g of the above-described solid catalyst which had been contacted with each other for 5 minutes. After dispersing the mixture in the autoclave for 5 minutes, 6 cc of a liquefied butene-1 was supplied under pressure, and pressure was raised up to 9 kg./cm$^2$-G with ethylene containing 2.5 mole% butene (molar ratio of butene/ethylene in gas, 0.07). Polymerization was initiated immediately and continued with supplying the above-described butene-containing ethylene for 2 hours to compensate the pressure drop. As a result, 33 g of a polymer product was obtained. The yield per solid catalyst was 270 and the yield per Zr atom was 120,000. The melt index of the product polymer was 0.17 g/10 min. and the butene content was 6.6 mole%. These values were obtained by correcting the values of the seed polymer with a presumption that logarithmic additivity is maintained in the melt index and simple additivity is maintained in the butene content.

EXAMPLE 2-11

Syntheses of various solid catalysts:

Solid catalysts were obtained in the same manner as in Example 1 except that conditions specified in Table 1 were employed. The results obtained are set forth in Table 1.

TABLE 1

| Catalyst | Support Type | Drying temperature (°C.) | Zr compound | Catalyst drying temperature (°C.) | Amount Al (% by wt)*[1] | Zr (% by wt)*[1] |
|---|---|---|---|---|---|---|
| II | SiO$_2$ | 400 | Cp$_2$ZrCl$_2$ | 40 | 6.3 | 0.70 |
| III | SiO$_2$ | 600 | Cp$_2$ZrCl$_2$ | 40 | 5.7 | 0.24 |
| IV | SiO$_2$ | 600 | (Cp*)$_2$ZrCl$_2$ | 40 | N.A.*[2] | N.A. |
| V | SiO$_2$ | 600 | (Ind)$_2$ZrCl$_2$ | 40 | 5.1 | 0.09 |
| VI | γ-Al$_2$O$_3$ | 500 | Cp$_2$ZrCl$_2$ | 40 | 4.7 | 0.31 |
| VII | MgO | 500 | Cp$_2$ZrCl$_2$ | 40 | N.A. | N.A. |

Cp: Cyclopentadienyl group; Cp*: Pentamethylcyclopentadienyl group; Ind: Indenyl group.
*[1]: % by weight in the solid catalyst; *[2]: No analysis made Copolymerization of ethylene and an α-olefin:

Copolymers were obtained in the same manner as in Example 1 except that the conditions specified in Table 2 were used. The results obtained are set forth in Table 2.

TABLE 2

Polymerization conditions and the results of polymerization

| Exam. No. | Solid catalyst Type. & Quantity (g) | Methyl-alumoxane Type, & Quantity (g) | Polymerization Temp. (°C.) | Comonomer Type | Initial Feed (ml) | Supplied Gas (mole % in ethylene) | Speed Polymer (g) | Product Polymer (g) | Yield per Catalyst Solid | Yield per Zr (× 10$^4$) | Melt Index | Content of Co-monomer (%)* | Induction Period |
|---|---|---|---|---|---|---|---|---|---|---|---|---|---|
| 2 | II 0.11 | III 0.19 | 60 | butene | 6 | 2.5 | 34 | 44 | 410 | 5.9 | 0.78 | 4.8 | none |
| 3 | III 0.092 | II 0.19 | 60 | butene | 6 | 2.5 | 37 | 23 | 250 | 10 | 0.46 | 5.5 | " |
| 4 | IV 0.089 | III 0.39 | 60 | butene | 6 | 2.5 | 37 | 18 | 210 | N.A. | 0.87 | 0.86 | " |
| 5 | V 0.20 | II 0.19 | 70 | butene | 6 | 2.5 | 32 | 11 | 50 | 5.5 | 0.66 | 4.0 | " |
| 6 | I 0.092 | IV 0.39 | 60 | butene | 6 | 2.5 | 33 | 28 | 300 | 13 | 0.23 | 4.9 | " |
| 7 | I 0.079 | III 0.19 | 60 | butene hexene | 13 3 | 6.0 butene | 32 | 56 | 710 | 30 | 0.74 | 9.6 Hexene | " |
| 8 | I 0.10 | III 0.19 | 60 | butene | 2 | 0.5 | 35 | 23 | 230 | 9.6 | 0.20 | 2.0 butene N.A. | " |
| 9 | VI 0.10 | III 0.19 | 60 | butene | 6 | 2.5 | 27 | 26 | 260 | 8.4 | 0.41 | N.A. | " |
| 10 | VII 0.10 | III 0.19 | 60 | butene | 6 | 2.5 | 26 | 29 | 290 | N.A. | 0.68 | N.A. | " |
| 11** | III 0.10 | II 0.39 | 60 | butene | 6 | 2.5 | 30 | 72 | 390 | 16 | 4.8 | N.A. | " |

*The content of hexene was measured by C$_{13}$ NMR, and the content of butene was measured by IR. The comonomer content in the seed polymer was corrected.
**Melting points measured by DSC of the polymer obtained were 98.4° C. and 112.7° C. (melting point of the seed polymer was 120.5° C.).

COMPARATIVE EXAMPLE 1

The copolymerization of ethylene and butene was conducted with the use of 0.77 g of the solid catalyst which had been used in Example 11 in the same manner as in Example 11 except that the alumoxane, Liquid II, of the component (B) was not used. As a result, a polymer was obtained in an amount of 17 g. The yield per solid catalyst was only 12 and the yield per Zr atom 5,000. Activity of the catalyst was thus very low.

COMPARATIVE EXAMPLE 2

The copolymerization of ethylene and butene was conducted in the same manner as in Example 11 except that the alumoxane, Liquid II, and the solid catalyst was not mixed or contacted preliminarily, and the former was added to the autoclave where it was dispersed for 10 minutes and the latter was then added in a quantity of 0.18 g. As a result, a polymer was obtained in an amount of 59 g, yield per solid catalyst thus being 330. However, polymerization was not immediately initiated even after the total pressure had been raised up to 9 kg/cm², and 10 minutes was required until the absorption of ethylene began. The result indicates that a time is required for the activation of the solid catalyst by the alumoxane of the component (B) which arrived at the Zr compound present on the surface of the solid catalyst as the active sites.

What is claimed is:

1. A process for producing ethylene copolymers which comprises contacting, in the gas phase, ethylene and an α-olefin having 3 to 10 carbon atoms with a catalyst thereby to copolymerize ethylene with the α-olefin, the catalyst comprising:
   a solid component, component (A), which is a zirconium compound having formed a π-bonding with a conjugated five-membered ring carried on a support of water-insoluble porous inorganic oxide particles that have been preliminary treated with an alumoxane; and
   an alumoxane, component (b);
   the alumoxane as the component (B) being in the form of a solution in an aromatic hydrocarbon in a concentration of at least 5% (w/v), the component (A) and the component (B) being introduced into a polymerization vessel after they have been contacted with each other, and the quantities of the component (A) and the component (B) being such that the atomic ratio of Al/Zr is in the range of 150 to 10,000.

2. The process according to claim 1, wherein said alumoxane has 4 to 50 alkyl groups having 1 to 8 carbon atoms.

3. The process according to claim 1, wherein said alumoxane has 6 to 30 lower alkyl groups.

4. The process according to claim 1, wherein the water-insoluble porous inorganic oxide particles are the particles of an oxide selected from the group consisting of silica, alumina and magnesia.

5. The process according to claim 1, wherein the treatment of the water-insoluble porous inorganic oxide with the alumoxane comprises contacting the two at a temperature of 20 to 100° C for 30 minutes to 20 hours.

6. The process according to claim 1, wherein the conjugated five-membered ring is a cyclopentadienyl group having 0 to 5 lower alkyl substituent(s) wherein when two lower alkyl substituents are present, they can form a ring by bonding to each other at their terminuses.

7. The process according to claim 1, wherein the conjugated five-membered ring is an indenyl group.

8. The process according to claim 1, wherein the zirconium compound which forms n-bonding with the conjugated five-membered ring is selected from the group consisting of bis(cyclopentadienyl)zirconium dichloride, bis(methylcyclopentadienyl)zirconium dichloride, bis(pentamethylcyclopentadienyl)zirconium dichloride, and bis(n-butylcyclopentadienyl)zirconium dichloride.

9. The process according to claim 1, wherein the atomic ratio of Al/Zr is in the range of 450 to 5,000.

10. The process according to claim 1, wherein the component (A) and the component (B) are supplied to the polymerization vessel within 0.5 second to 1 hour after contacting the two.

11. The process according to claim 1, wherein the α-olefin having 3 to 10 carbon atoms which is copolymerized with the ethylene is butene and/or hexene.

12. The process according to claim 1, wherein the component (B) is in the form of a solution in an aromatic hydrocarbon in a concentration of 5 to 50% (w/v).

13. The process according to claim 1, wherein the component (B) is in the form of a solution in an aromatic hydrocarbon of 5 to 30% (w/v).

14. A process for producing ethylene copolymers which comprises contacting, in the gas phase, ethylene and an α-olefin having 3 to 10 carbon atoms with a catalyst comprising:
   a solid component, component (A), which is a zirconium compound having formed a π-bonding with a conjugated five-membered ring, the zirconium compound being selected from zirconocenes, carried on a support of water-insoluble porous inorganic oxide particles that have been preliminarily treated with an alumoxane having 4 to 50 alkyl groups of 1 to 8 carbon atoms, the inorganic oxide being selected from the group consisting of silica, alumina and magnesia; and
   an alumoxane having 4 to 50 alkyl groups of 1 to 8 carbon atoms, component (B);
   the alumoxane as the component (B) being in the form of a solution in an aromatic hydrocarbon in a concentration of 5 to 50% (w/v), the component (A) and the component (B) being introduced into a polymerization vessel after they have been contacted with each other thus in the form of a slurry, and the quantities of the component (A) and the component (B) being such that the atomic ratio of Al/Zr is in the range of 150 to 10,000.00.

15. The process according to claim 14, wherein said alumoxane has 6 to 30 lower alkyl groups.

16. The process according to claim 14, wherein the treatment of the water-insoluble porous inorganic oxide with the alumoxane comprises contacting the two at a temperature of 20 to 100° C. for 30 minutes to 20 hours.

17. The process according to claim 14, wherein the zirconocene is selected from the group consisting of bis(cyclopentadienyl) zirconium dichloride, bis(methylcyclopentadienyl)zirconium dichloride, bis(pentamethylcyclopentadienyl)zirconium dichloride, and bis(n-butylcyclopentadienyl)zirconium dichloride.

18. The process according to claim 14, wherein the atomic ratio of Al/Zr is in the range of 450 to 5,000.

19. The process according to claim 14, wherein the component (A) and the component (B) are supplied to the polymerization vessel within 0.5 seconds to 1 hour after contacting the two.

20. The process according to claim 14, wherein the α-olefin having 3 to 10 carbon atoms which is copolymerized with the ethylene is butene and/or hexene.

* * * * *